United States Patent [19]

Holdeman

[11] 4,337,675

[45] Jul. 6, 1982

[54] TRANSMISSION SHIFT CONTROL APPARATUS

[75] Inventor: John W. Holdeman, Muncie, Ind.

[73] Assignee: Borg-Warner Corporation, Chicago, Ill.

[21] Appl. No.: 153,128

[22] Filed: May 27, 1980

[51] Int. Cl.³ ........................... G05G 5/10; G05G 9/12
[52] U.S. Cl. ......................................... 74/477; 74/104;
  74/107; 74/337.5; 74/359; 74/471 R; 192/93 R
[58] Field of Search ....................... 74/104, 107, 337.5,
   74/359, 471 R, 477, 483 R; 192/93 R

[56] References Cited

U.S. PATENT DOCUMENTS

| | | | |
|---|---|---|---|
| 847,754 | 3/1907 | Flinchbaugh | 192/93 R X |
| 1,687,721 | 10/1928 | Glosh | 74/477 X |
| 1,902,990 | 3/1933 | Campbell | 192/93 R X |
| 3,202,005 | 8/1965 | Ivanchich | 74/333 |
| 3,677,104 | 7/1972 | Hirozawa et al. | 74/337.5 X |
| 3,739,656 | 6/1973 | Williams et al. | 74/337.5 X |
| 3,929,029 | 12/1975 | Kelbel | 74/473 R |
| 4,022,079 | 5/1977 | Hidaka | 74/477 |
| 4,228,693 | 10/1980 | Kelbel | 74/477 |

FOREIGN PATENT DOCUMENTS 21012 of 1910 United Kingdom ............. 74/471 R

OTHER PUBLICATIONS

Ford Motor Company 1975 Car Shop Manual, vol. I, Chassis, 1st printing-Jan. 1975, part 16-28-1 through 16-28-8 & 16-29-1 through 16-29-11.

Primary Examiner—Allan D. Herrmann
Attorney, Agent, or Firm—Julian Schachner

[57] ABSTRACT

Shift control apparatus for a multiple speed, sliding gear manual transmission is characterized by the provision of a main shift rail which is rotatable for crossover selection and axially slidable for engagement of the selected speed ratio. An auxiliary shift rail is axially slidable for engagement of an auxiliary gear, and a reverse idler gear is axially slidable for engagement of a reverse gear. A single lever is provided for camming the auxiliary shift rail in its engaging direction upon axial sliding movement of the main shift rail in a first direction, and for camming the reverse idler gear in its engaging direction upon axial sliding movement of the main shift rail in the opposite direction. The camming arrangement locks the reverse idler gear as the auxiliary shift rail slides, and locks the auxiliary shift rail as the reverse idler gear slides.

6 Claims, 9 Drawing Figures

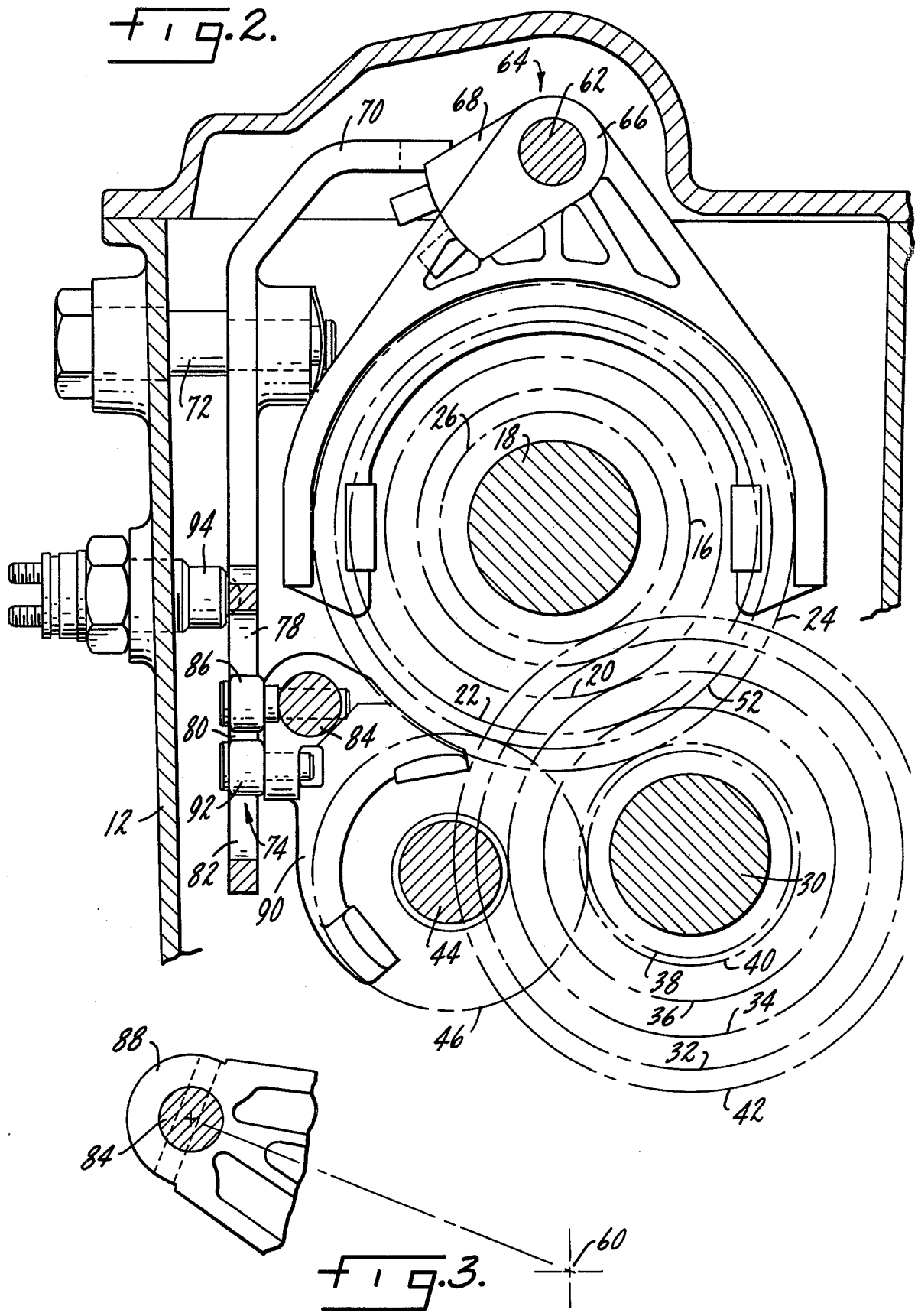

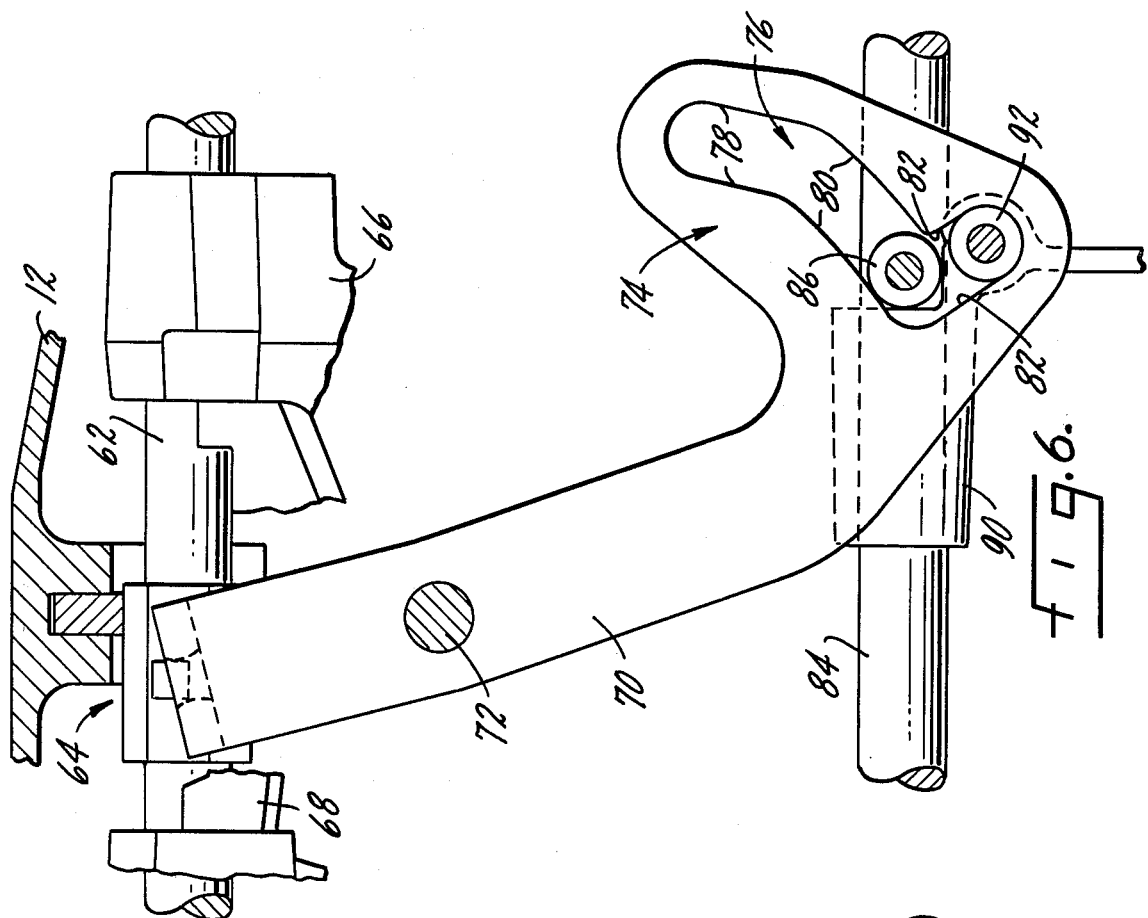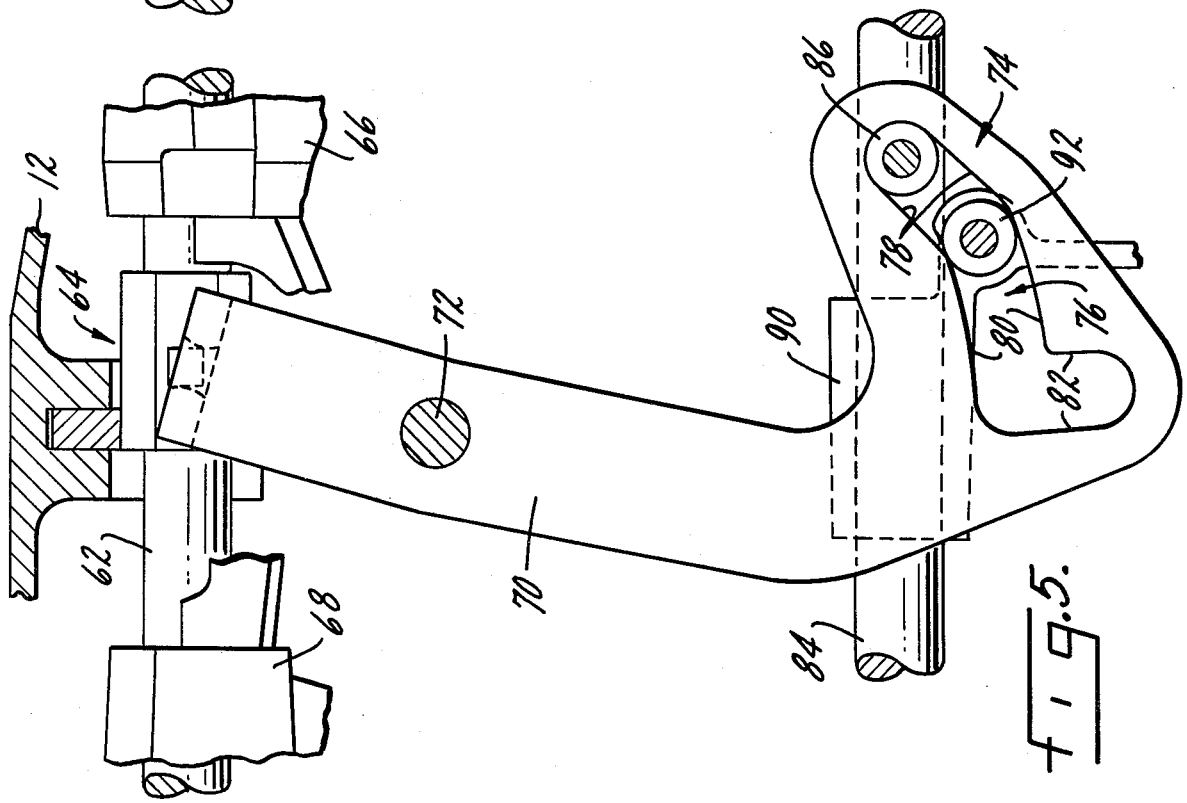

TRANSMISSION SHIFT CONTROL APPARATUS

BACKGROUND OF THE INVENTION

This invention relates generally to the control of an automotive transmission or the like. More particularly, it relates to improved shift control apparatus for a multiple speed, sliding gear manual transmission.

In recent years there have been many improvements in automotive drive trains, including improvements relating to control apparatus for shifting manual transmissions. Generally, for transmissions incorporating a plurality of forward speed ratios and a reverse speed ratio, the shift control apparatus provides appropriate crossover positions for the shift stick. Each crossover position selects a shift fork or the like, which may be moved longitudinally to engage either of two speed ratios. In a five-speed and reverse transmission, for example, one crossover position might select the first and second forward speed ratios, another the third and fourth forward speed ratios, and yet another the fifth forward and reverse speed ratios.

Copending U.S. application Ser. No. 968,058 filed Dec. 11, 1978 now U.S. Pat. No. 4,228,693 discloses shift control apparatus wherein a main shift rail is rotatable about its longitudinal axis to four positions for crossover selection. In each crossover position the main shift rail is slidable longitudinally along its axis so as to engage the selected speed ratio. In the first and second positions, the main shift rail is slidable to engage respectively the first or second forward speed ratio and the third or fourth forward speed ratio. In the third and fourth positions, the main shift rail is slidable to engage either the fifth forward or reverse speed ratio.

An auxiliary shift rail is slidable to engage fifth, and a reverse idler gear is slidable to engage reverse. The auxiliary shift rail and the reverse idler gear are coupled with the main shift rail by a linkage mechanism. The linkage mechanism is effective to move the auxiliary shift rail in a gear-engaging direction upon sliding of the main shift rail in one longitudinal direction, while at the same time preventing movement of the reverse idler gear. The linkage mechanism also is effective to slide the reverse idler gear in a gear-engaging direction upon sliding of the main shift rail in th opposite longitudinal direction, while at the same time preventing movement of the auxiliary shift rail.

This linkage mechanism requires two levers arranged in a complicated assembly, and two cam devices which must be precisely coordinated. This results in a linkage mechanism which is complex and expensive. Thus, there remains a need in the art for a simple, inexpensive linkage mechanism which may be incorporated in transmission shift control apparatus of the type disclosed.

SUMMARY OF THE INVENTION

A primary object of this invention is to meet the need noted above. To that end, there is provided shift control apparatus which may be incorporated in a multiple speed, sliding gear manual transmission having, for example, five fully synchronized forward speed ratios and a reverse speed ratio. The apparatus includes a simple, inexpensive linkage mechanism for coupling the main shift rail with both the auxiliary shift rail and the reverse idler gear.

A simple lever is pivotally supported on a single fulcrum, and is selectible by the main shift rail. Upon movement of the main shift rail in one direction, the lever pivots in one direction to move the auxiliary shift rail in a gear-engaging direction. At the same time, the lever prevents movement of the reverse idler gear.

Upon movement of the main shift rail in the opposite direction, the lever pivots in the opposite direction to move the reverse idler gear in a gear-engaging direction. At the same time, the lever prevents movement of the auxiliary shift rail.

To effect these movements, the lever defines a three-part cam with which two cam followers are engaged. Pivotal movement of the lever in either direction moves one cam follower while locking the other.

BRIEF DESCRIPTION OF THE DRAWINGS

The objects and advantages of this invention will become apparent to those skilled in the art upon careful consideration of the specification herein, including the drawings, wherein:

FIG. 2 is a sectional view taken along the line 2—2 of FIG. 1 showing details of the shift control apparatus, with some structure simplified or omitted for clarity;

FIG. 3 is a partial sectional view similar to FIG. 2 showing additional details of the shift control apparatus;

FIG. 5 is a partial sectional view similar to FIG. 1 showing another position of the linkage mechanism;

FIG. 6 is a partial sectional view similar to FIG. 1 showing still another position of the linkage mechanism;

Figure 1:
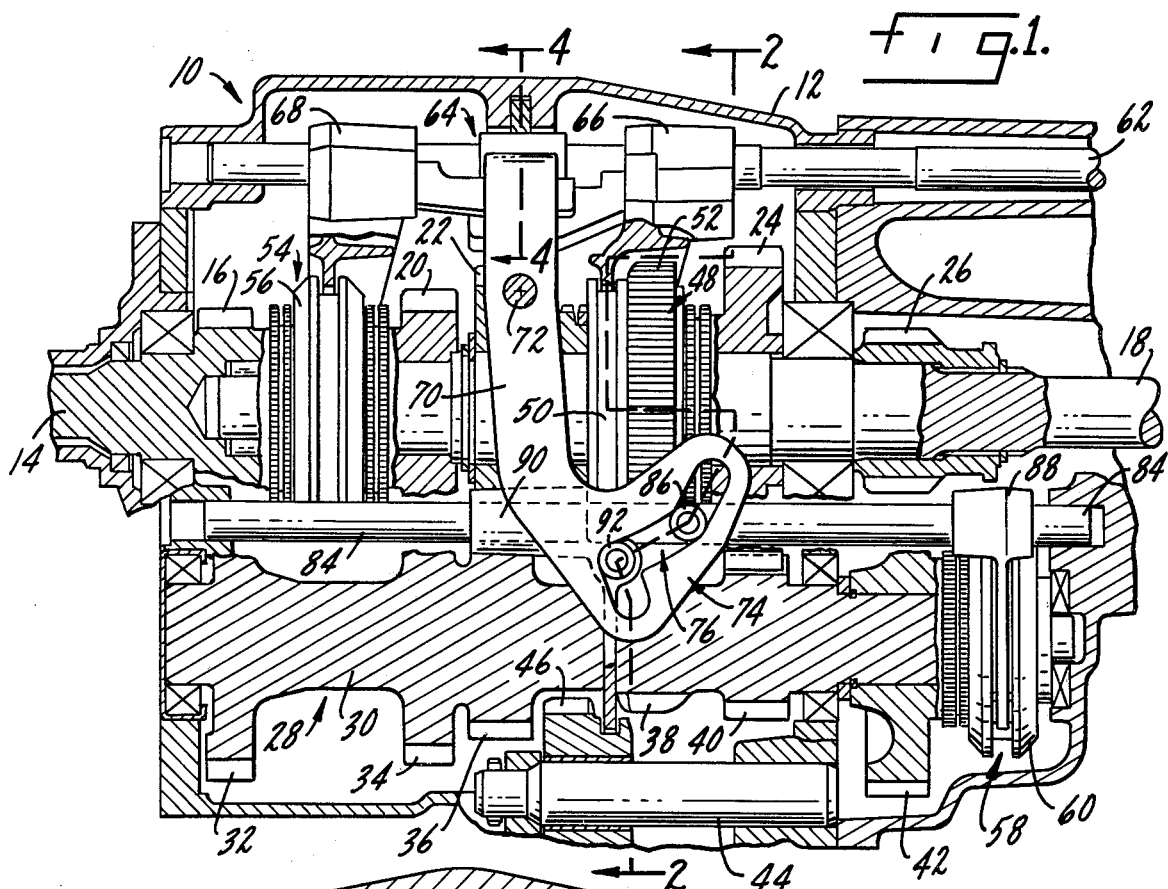
FIG. 1 is a cut-away view of a five-speed transmission, partially in section, showing the overall relationship of the components, with the gears revolved into the plane of the paper for clarity.
Figure 4:
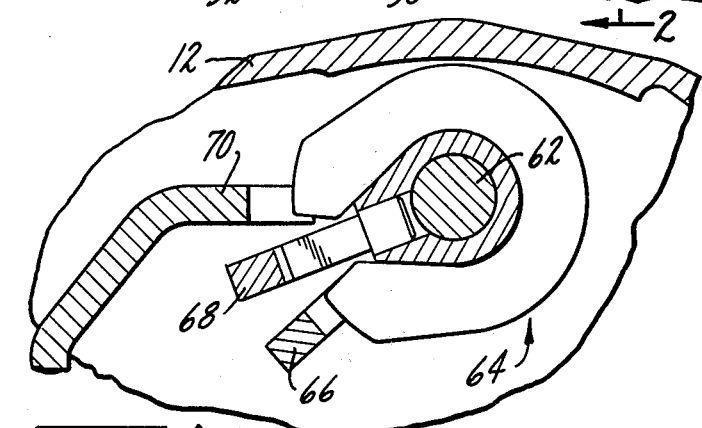
FIG. 4 is a sectional view taken along the line 4—4 of FIG. 1 showing details of the selector mechanism, with some structure simplified or omitted for clarity.

While this invention is susceptible of embodiment in many different forms, a preferred embodiment is shown in the drawings and will be described in detail. It should be understood that the present disclosure is considered to be an exemplification of the principles of the invention, and is not intended to limit the invention to this embodiment.

DESCRIPTION OF A PREFERRED EMBODIMENT

Referring now to the drawings in greater detail, there is shown generally a multiple speed, sliding gear manual transmission 10 adapted for use in an automotive vehicle. Transmission 10 includes a transmission housing 12. An input shaft 14 is journalled in housing 12 and is adapted to receive torque from an associated engine through an appropriate clutch. Input shaft 14 defines an input gear 16.

An output shaft 18 in the form of a mainshaft is journalled in housing 12. Output gears 20, 22 and 24 are journalled on mainshaft 18. Another output gear 26 is secured to mainshaft 18.

A cluster gear assembly 28 includes a countershaft 30 journalled in housing 12. Defined by countershaft 30 is a drive gear 32 in mesh with input gear 16. Similarly, there are defined a countershaft gear 34 in mesh with output gear 20, a countershaft gear 36 in mesh with output gear 22, a countershaft gear 38, and a countershaft gear 40 in mesh with output gear 24. In addition, a countershaft gear 42 is journalled on countershaft 30 and is in mesh with output gear 26.

A reverse idler shaft 44 is supported in housing 12. A reverse idler gear 46 is journalled on shaft 44 and is slidable relative thereto.

A first synchronizing clutch 48 is supported by mainshaft 18 between gears 22 and 24. Synchronizer 48 includes a sleeve 50 which defines an output gear 52. Gears 38 and 52 are in alignment when sleeve 50 is in its neutral position, such that reverse idler gear 46 is slidable into and out of mesh with them.

A second synchronizing clutch 54 is supported by mainshaft 18 between gears 16 and 20. Synchronizer 54 includes a sleeve 56.

A third synchronizing clutch 58 is supported by countershaft 30 between gear 42 and housing 12. Synchronizer 58 includes a sleeve 60.

A first, main shift rail member 62 is supported in housing 12 for rotation about and longitudinal sliding movement along its own axis. A suitable crossover selector mechanism 64 is associated with shift rail 62. Suitable shift forks 66 and 68 also are associated with shift rail 62 and selector mechanism 64, and are respectively in driving engagement with sleeves 50 and 56 of synchronizers 48 and 54. Selector mechanism 64 and shift forks 66 and 68 may be, for example, of the type disclosed in U.S. Pat. No. 3,929,029 issued Dec. 30, 1975.

A linkage mechanism includes a lever 70 pivotally supported on a fulcrum 72 extending inwardly of housing 12. Lever 70 defines a cam device 74. Cam device 74 includes a three-part cam 76 in the form of a slot or track with a first camming portion 78, an intermediate neutral portion 80 with a center of curvature on fulcrum 72, and a second camming portion 82.

A second, auxiliary shift rail member 84 is supported in housing 12 for longitudinal sliding movment along its own axis. A first cam follower member 86 in the form of a roller or the like is carried by shift rail 84 and extends into cam 76. A shift fork 88 also is carried at one end of shift rail 84, and is in driving engagement with sleeve 60 of synchronizer 58.

A shift fork 90 in the form of a sleeve member or the like is slidably received on shift rail 84, and is in driving engagement with reverse idler gear 46. A second cam follower member 92 in the form of a roller or the like is carried by shift fork 90 and extends into cam 76.

Figure 7:
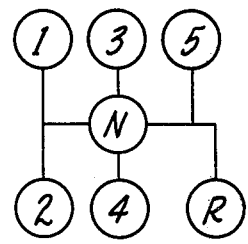
FIG. 7 is a diagrammatic view illustrating the five-speed shift pattern as seen by an operator.

As disclosed in the aforementioned U.S. application Ser. No. 968,058, shift rail 62 is rotatable to first, second, third and fourth crossover positions. In the first two positions, selector mechanism 64 is in alignment respectively with shift forks 66 and 68. In both the third and fourth positions, selector mechanism 64 is in alignment with lever 70. Once crossover selection has been made, longitudinal movement of shift rail 62 engages the selected gear according to the shift pattern illustrated in FIG. 7.

In the first crossover position, selector mechanism 64 is in alignment with shift fork 66. Rearward movement of shift rail 62 (to the right as shown in FIG. 1) moves shift fork 66 and sleeve 50 rearwardly to engage the first forward speed ratio. Similarly, forward movement of shift rail 62 (to the left as shown in FIG. 1) moves shift fork 66 and sleeve 50 forwardly to engage the second forward speed ratio. Cam 76 locks rollers 86 and 92. Synchronizer 58 and reverse idler gear 46 cannot move.

In the second crossover position, selector mechanism 64 is in alignment with shift fork 68. Rearward or forward movement of shift rail 62 respectively engages the third or fourth forward speed ratio. Cam 76 locks rollers 86 and 92. Synchronizer 58 and reverse idler gear 46 cannot move.

In the third and fourth crossover positions, selector mechanism 64 is in alignment with lever 70. Rearward movement of shift rail 62 pivots lever 70 clockwise about fulcrum 72 from the intermediate, neutral position shown in FIG. 1 to a first extreme, engaging position shown in FIG. 5. Track portion 78 of cam 76 wedges roller 86 forwardly. Shift rail 84, shift fork 88 and sleeve 60 are moved forwardly, and synchronizer 58 engages the fifth forward speed ratio. Due to the fact that track portion 80 of cam 76 has a center of curvature on fulcrum 72, roller 92 remains locked. Reverse idler gear 46 cannot move.

Forward movement of shift rail 62 pivots lever 70 counterclockwise about fulcrum 72 from the intermediate, neutral position shown in FIG. 1 to a second extreme, engaging position shown in FIG. 6. Track portion 82 of cam 76 wedges roller 92 rearwardly, and shift fork 90 moves reverse idler gear 46 into meshing engagement with gears 38 and 52. Lever 70 actuates a conventional reverse light switch 94. Due to the fact that track portion 80 of cam 76 has a center of curvature of fulcrum 72, roller 86 remains locked. Synchronizer 58 cannot move.

Thus it will be seen that rearward movement of shift rail 62 in the third crossover position causes forward movement of synchronizer 58 to engage the fifth forward speed ratio. Forward movement of shift rail 62 in the fourth crossover position causes rearward movement of reverse idler gear 46 to engage the reverse speed ratio. Other shift patterns may be obtained by suitable modification of the linkage mechanism.

Figure 8:
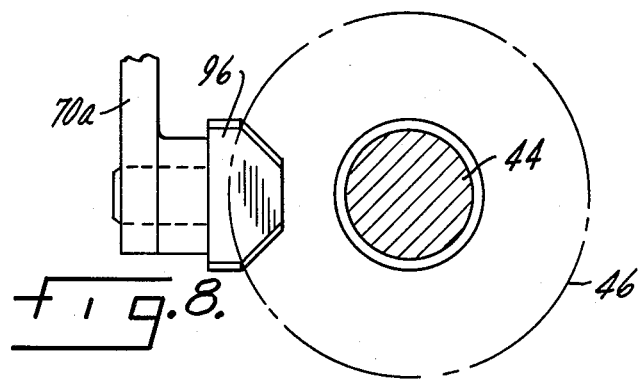
FIG. 8 is a partial sectional view similar to FIG. 2 showing details of the linkage mechanism in a four-speed transmission.
Figure 9:
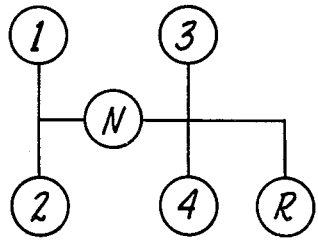
FIG. 9 is a diagrammatic view illustrating the four-speed shift pattern as seen by an operator.

Although the shift control apparatus disclosed herein is for use in conjunction with a transmission having five forward speed ratios and a reverse speed ratio, it is readily adaptable for use in other transmissions. For example, in a four-speed transmission, cam device 74 would not be required. As shown in FIG. 8, a lever 70a would be substituted for lever 70. Lever 70a would be pivotally supported on fulcrum 72. A pad 96 or the like, secured to lever 70a, would extend into driving engagement with reverse idler gear 46. The shift pattern would be that shown in FIG. 9. Here, too, other shift patterns could be obtained by suitable modification of the linkage mechanism.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. In a multiple speed ratio power transmission having gear ratios selectively engageable for defining torque delivery paths between an input member and an output member, and shift control means for selectively engaging said gear ratios; the improvement wherein said shift control means comprises first engaging means slidable in an engaging direction for engaging one gear ratio, second engaging means slidable in an engaging direction for engaging another gear ratio, and a lever pivotable about a fulcrum between an intermediate position and first and second engaging positions, said lever and said engaging means defining camming means for sliding said first engaging means in its engaging direction in response to pivoting of said lever from said intermediate position to said first engaging position and for sliding said second engaging means in its engaging direction in response to pivoting of said lever from said intermediate position to said second engaging position, said caming means preventing sliding of said second engaging means as said lever pivots between said intermediate and first engaging positions and preventing sliding of said first engaging means as said lever pivots between said intermediate and second engaging positions, said second engaging means being slidably supported by said first engaging means.

2. The invention of claim 1, said camming means including a cam track defined by said lever, and first and second cam followers respectively connected to said first and second engaging means, said cam track having a first camming track portion for camming said first cam follower as said lever pivots between said intermediate and first engaging positions, said cam track having a neutral track portion contiguous to said second cam follower as said lever pivots between said intermediate and first engaging positions, said neutral track portion having a center of curvature on said fulcrum, and said cam track having a second camming track portion for camming said second cam follower as said lever pivots between said intermediate and first engaging positions, said neutral track portion being contiguous to said first cam follower as said lever pivots between said intermediate and second engaging positions.

3. The invention of claim 1 or 2, said first engaging means including a slidable rail, and said second engaging means including a sleeve slidably received on said rail.

4. In a transmission having a plurality of gears selectively engageable for establishing a plurality of gear ratios; shift control apparatus comprising a lever pivotable about a fulcrum in said transmission between an intermediate position and first and second extreme positions, said lever defining a cam including a cam track having an intermediate neutral track portion with a center of curvature on said fulcrum and first and second camming track portions extending therefrom, first and second gear shifting members slidable in said transmission, said first and second members respectively including first and second cam followers engaging said cam track, and means for pivoting said lever about said fulcrum, said first and second cam followers respectively engaging said cam track at approximately the junction of said neutral track portion with said first and second camming track portions when said lever is in said intermediate position.

5. The invention of claim 4, said first member including a shift rail, and said second member including a sleeve slidable on said shift rail.

6. In a transmission having a plurality of gears selectively engageable for establishing a plurality of gear ratios; shift control apparatus comprising a lever pivotable about a fulcrum in said transmission between an intermediate position and first and second extreme positions, said lever defining a cam including a cam track having an intermediate neutral track portion with a center of curvature on said fulcrum and first and second camming track portions extending therefrom, first and second gear shifting members slidable in said transmission, said first and second members respectively including first and second cam followers engaging said cam track, and means for pivoting said lever about said fulcrum, said first member including a shift rail, and said second member including a sleeve slidable on said shift rail.

* * * * *

UNITED STATES PATENT AND TRADEMARK OFFICE
CERTIFICATE OF CORRECTION

PATENT NO. : 4,337,675

DATED : July 6, 1982

INVENTOR(S) : John W. Holdeman

It is certified that error appears in the above—identified patent and that said Letters Patent is hereby corrected as shown below:

Column 4, line 30, cancel "of" and insert -- on --.

Signed and Sealed this

Twenty-sixth Day of October 1982

[SEAL]

Attest:

GERALD J. MOSSINGHOFF

Attesting Officer

Commissioner of Patents and Trademarks